United States Patent
Watanabe (10) Patent No.: US 10,168,556 B2
(45) Date of Patent: Jan. 1, 2019

(54) FARADAY ROTATOR AND OPTICAL ISOLATOR BASED ON THIS FARADAY ROTATOR

(71) Applicant: SHIN-ETSU CHEMICAL CO., LTD., Tokyo (JP)

(72) Inventor: Toshiaki Watanabe, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 111 days.

(21) Appl. No.: 15/354,552

(22) Filed: Nov. 17, 2016

(65) Prior Publication Data
US 2017/0192258 A1    Jul. 6, 2017

Related U.S. Application Data (63) Continuation of application No. 14/781,324, filed as application No. PCT/JP2014/050196 on Jan. 9, 2014.

(30) Foreign Application Priority Data

Apr. 1, 2013 (JP) .................. 2013-075772

(51) Int. Cl.
*G02F 1/09* (2006.01)
*G02B 5/30* (2006.01)
(Continued)

(52) U.S. Cl.
CPC .............. *G02F 1/093* (2013.01); *B28B 3/003* (2013.01); *B28B 11/0845* (2013.01);
(Continued)

(58) Field of Classification Search
CPC .......... G02F 1/0036; G02F 1/09; G02F 1/091; G02F 1/093
(Continued)

(56) References Cited

U.S. PATENT DOCUMENTS

| | | | |
|---|---|---|---|
| 7,253,129 B2 * | 8/2007 | Takagimi | C04B 35/44 264/663 |
| 2006/0112873 A1 * | 6/2006 | Uchida | C30B 19/02 117/30 |

(Continued)

FOREIGN PATENT DOCUMENTS

| | | |
|---|---|---|
| CN | 102976716 A * | 3/2013 |
| JP | 8-240791 A | 9/1996 |

(Continued)

OTHER PUBLICATIONS

Yoshida, et al. "Optical Properties and Faraday Effect of Ceramic Terbium Gallium Garnet for a Room Temperature raraday Rotator." Optics Express 19.16 (2011): 15181-5187. Web.*

(Continued)

*Primary Examiner* — Nicholas R. Pasko
(74) *Attorney, Agent, or Firm* — Westerman, Hattori, Daniels & Adrian, LLP (57) ABSTRACT

To provide a faraday rotator using a TGG ceramic sintered compact and a light isolator using the faraday rotator such that the influence of scattered light can be relatively reduced and overall characteristics degradation for the entire light isolator is minimized so that a high extinction ratio of at least 38 dB or greater is achieved.

[Solution] The faraday rotator according to the present invention uses a TGG ceramic sintered compact having an average particle diameter of 0.2 to 5.0 µm, and has a transmission beam diameter of 0.3 mm or more, the TGG ceramic sintered compact being preferably annealed.

3 Claims, 5 Drawing Sheets

(51) Int. Cl.
- *G02B 27/28* (2006.01)
- *G02F 1/00* (2006.01)
- *B28B 3/00* (2006.01)
- *B28B 11/08* (2006.01)
- *C04B 35/50* (2006.01)

(52) U.S. Cl.
CPC .......... *B28B 11/0872* (2013.01); *C04B 35/50* (2013.01); *G02B 5/3025* (2013.01); *G02B 27/283* (2013.01); *G02F 1/0036* (2013.01); *C04B 2235/3286* (2013.01)

(58) Field of Classification Search
USPC .......................................... 359/484.01–484.1
See application file for complete search history.

(56) References Cited

U.S. PATENT DOCUMENTS

| | | | | |
|---|---|---|---|---|
| 2011/0133111 A1* | 6/2011 | Makikawa | ............... | C04B 35/50 252/62.51 R |
| 2014/0002900 A1* | 1/2014 | Makikawa | ............... | C04B 35/50 359/484.03 |
| 2015/0129816 A1* | 5/2015 | Nozawa | .................. | C04B 35/01 252/582 |

FOREIGN PATENT DOCUMENTS

| | | | |
|---|---|---|---|
| JP | 2006-292799 A | | 10/2006 |
| JP | 2007-58161 A | | 3/2007 |
| JP | 2008-1556 A | | 1/2008 |
| JP | 2009-143751 A | | 7/2009 |
| JP | 2009143751 A | * | 7/2009 |
| JP | 2009143751 A | * | 7/2009 |
| JP | 5000934 B2 | | 8/2012 |
| WO | 2012/124754 A1 | | 9/2012 |

OTHER PUBLICATIONS

English machine translation of JP 2009143751 A.*
Yoshida, et al. "Optical Properties and Faraday Effect of Ceramic Terbium Gallium Garnet for a Room Temperature raraday Rotator." Optics Express 19.16 (2011): 15181-5187. Web. (Year: 2011).*
English machine translation of JP 2009143751 A (Year: 2009).*
International Search Report dated Feb. 4, 2014, issued in counterpart International Application No. PCT/JP2014/050196 (2 pages).
Yasuhara et al., "Measurement of Magnet-Optical Property and Thermal Conductivity on TGG Ceramic for Faraday Material of High-Peak and High Average Power Laser", Laser Original, 2007, pp. 806-810, vol. 35, No. 12.
Muramatsu et al., "Development of optical ceramics materials", OPTRONICS, 2012, pp. 123-126, No. 9.
Yoshida, et al. "Optical Properties and Faraday Effect of Ceramic Terblum Gallium Garnet for a Room Temperature Faraday Rotator." Optics Express 19.16 (2011): 15181-5187. Web.
Yasuhara, et al. "Optical Properties and Faraday Effect of Ceramic Terblum Gallium Garnet for a Room Temperatrue Faraday Rotator." Optics Letters 39.5 (2014): 1145-148. Web.

* cited by examiner

FIG. 4

Cross-sectional View of 1.5-inch-diameter TGG Crystal grown by CZ Method

FIG. 5

Initial Measurement Points

Measurement Points after Grinding and Annealing

FIG. 6

FARADAY ROTATOR AND OPTICAL ISOLATOR BASED ON THIS FARADAY ROTATOR

CROSS-REFERENCE TO RELATED APPLICATIONS

This application is a Continuation of U.S. application Ser. No. 14/781,324 filed on Sep. 30, 2015, which is a national stage application filed under 35 USC § 371 of International Application No. PCT/JP2014/050196, filed Jan. 9, 2014, and which is based upon and claims the benefit of priority from the prior Japanese Patent Application No. 2013-075772, filed on Apr. 1, 2013, the entire contents of which are incorporated herein by reference.

TECHNICAL FIELD

The present invention relates to a Faraday rotator made by using a terbium gallium garnet denoted by $Tb_3Ga_5O_{12}$ (hereinafter referred to simply as "TGG") which has a high extinction ratio; and also the invention relates to an optical isolator using this Faraday rotator.

BACKGROUND TECHNOLOGY

In an optical system, when a laser light is emitted from a semiconductor laser oscillator, which is the light source, some of the light becomes reflected light returning from optical elements provided in an optical communication path or the surfaces of devices provided in a partially overlapping optical transmission line or the like, and when the reflected light returns to the laser oscillator, the laser oscillator's performance may become unstable, or the laser oscillator itself may be damaged. So, in order to shield the reflected light off the laser oscillator, an optical isolator is used, and this optical isolator employs a Faraday rotator so as to make use of the latter's Faraday effect.

In general, in an optical communication field of 1200-1650 nm, a bismuth-substituted rare-earth iron garnet which is grown by a liquid phase epitaxial growth method is used as a material to make the Faraday rotator; however this material undergoes material absorption attributable to an ion ingredient, so that in recent years TGG, which undergoes less material absorption, is used. In the case of TGG, a TGG single crystal rod grown by CZ method is used after machining; however, it is difficult to grow a large-sized TGG crystal so that a growth of an ingot of only 1-2 inches in diameter is general, with a resultant problem that the crystal is vulnerable to the influence of deformation induced by machining as well as deformation during the growth.

In addition to TGG single crystal grown based on CZ method, use of a TGG ceramics to make Faraday rotator is being studied as a result of improvement in ceramics technology. Non-IP Publication 1 introduces a TGG ceramics which has similar thermal conductivity and Verdet's constant as a TGG single crystal does, and Non-IP Publication 2 introduces a development of a high quality TGG ceramics having an excellent extinction ratio of ~40 dB and having similar Faraday effect as a TGG ceramics does. Furthermore, IP Publication 3 describes that a transparent rare-earth gallium garnet sintered compact denoted by a general formula of $R_3Ga_5O_{12}$ (wherein R is at least one kind of rare-earth element selected from Y, Sm, Gd, Tb, Dy, Ho, Er, Tm, Yb and Lu), as the Faraday rotator of an optical isolator.

However, such TGG ceramics sintered compacts are liable to be affected by transmitted beam on account of their grain boundary, and it is pointed out that, similarly as in the case of TGG single crystal, their extinction capability in their material peripheries is degraded owing to the deformation during the material growth, manufacturing or machining stages, with a resulting problem that the isolation (light shielding capability) of the optical isolator is degraded.

PRIOR ART DOCUMENTS

Non-IP Documents

Non-IP Document 1:
  "Laser Original" Volume No. 35, No. 12, pages 806 through 810, December, 2007
Non-IP Document 2:
  "OPTRONICS" No. 9, 2012, pages 123 through 126

Non-IP Documents

IP Document 1:
  Japanese Patent No. 5000934

SUMMARY OF THE INVENTION

The Problems the Invention Seeks to Solve

In view of the above circumstances, it is an object of the present invention to propose a Faraday rotator which uses a TGG ceramics sintered compact which can relatively attenuate the influences of scattered light, suppress the degradation of the overall properties of the optical isolator and have an extinction ratio of as high as 38 dB or higher; and the invention also relates to an optical isolator using such Faraday rotator.

A better isolator has a higher isolation (shielding capability) and it is especially preferable that an isolator has an isolation (shielding capability) of 35 dB or higher; in order to attain this isolation the light transmission part of each one of optical devices (polarizer, analyzer, Faraday rotator) that constitute the optical isolator must have an extinction ratio of at least 35 dB or higher, or even 38 dB or higher when assembling margin is taken into consideration. Also, for example, in the case of an optical isolator of a type which has two light separating surfaces, its incident light separating surface needs to have a relatively large area where the extinction ratio is high.

Incidentally, an optical isolator is composed of a Faraday rotator made of costly TGG and other parts, and to reduce the cost of the TGG it has been a practice to make the diameter of the TGG Faraday rotator as small as possible. But in the case of two light separating surface type isolator, when the diameter of the TGG is reduced, the two lights would pass the vicinities of the outer peripheries of the Faraday rotator so that a problem is that the isolation is degraded as the lights pass in the vicinities of the outer peripheries. In order to secure a high isolation (shielding capability) of at least 35 dB or higher, the extinction ratio in the vicinities of the peripheries of the Faraday rotator need be 38 dB or higher.

Thus the present inventors studied and researched hard to attain a goal of solving the problem of the degradation of light shielding capability of a TGG ceramics sintered compact so as to achieve the status of the optical isolators isolation (shielding capability) being 38 dB or higher, and as a result they discovered a new problem that, in the case of TGG ceramics sintered compact, the isolation of the optical isolator is degraded when the diameter of the transmitted beam is constricted to 0.3 mm or smaller, because the influence of the grain boundary is increased to cause increased influence of light scattering. Also, it was found that in the case of TGG sintered compact, the influence of the machining deformation after the machining to obtain the specified outer diameter can significantly cause property degradation.

Then, as they studied to solve this new problem, the present inventors found that there exists an interdependency between the grain diameter and the diameter of the transmitted beam, and learned that by setting the diameter of the transmitted beam to 0.3 mm or greater and the grain diameter to 0.2-5.0 micrometers, it is possible to suppress the degradation of isolation and to stably secure the isolation to a value as high as 38 dB or even higher. Also, in the cases of TGG ceramics sintered compact and TGG crystal, although the extinction capability undergoes degradation owing to the deformation incurred during the material growth, manufacturing or machining stages, the present inventors found that like in the case of TGG crystal, if the TGG ceramics sintered compact is subjected to an annealing treatment, the extinction capability is significantly improved and hence possessed the present invention Means to Solve the Problems Hence the Faraday rotator of the present invention is characteristic in that it uses a TGG ceramics sintered compact of a mean grain diameter of 0.2-5.0 micrometers, that in it a diameter of the transmitted beam is 0.3 mm or greater, and that it has an extinction ratio of 38 dB or higher.

Also the TGG ceramics sintered compact of the present invention is characterized that it is annealed. Furthermore, the Faraday rotator of the present invention is preferably used in an optical isolator.

Effects of the Invention

According to the present invention, it is possible to provide a Faraday rotator using a TGG ceramics sintered compact which can relatively attenuate the influence of scattered light and suppress the degradation of the overall properties of the optical isolator and have an extinction ratio of 38 dB or higher; also it is possible to provide an optical isolator using such Faraday rotator.

BRIEF DESCRIPTION OF DRAWINGS

FIG. 1 An example of the structure of a polarization-independent type optical isolator FIG. 2 A chart to show a relation between the extinction ratio and the mean grain diameter as of the time when the diameter of transmitted beam is 0.1 mm FIG. 3 A chart to show a relation between the diameter of transmitted beam and the extinction ratio in cases of different mean grain diameters of works FIG. 4 A cross sectional view of a TGG crystal of 1.5-inch diameter grown by CZ method, showing 13 sections where measurements were conducted FIG. 5 Drawings of a TGG crystal body to show where measurements of extinction ratio were conducted at times before and after grind machining and anneal treatment FIG. 6 Drawings of a TGG sintered compact to show where measurements of extinction ratio were conducted at times before and after grind machining and anneal treatment Now, an embodiment of the present invention will be described below, but the present invention shall not be construed limited thereby.

Figure 1:
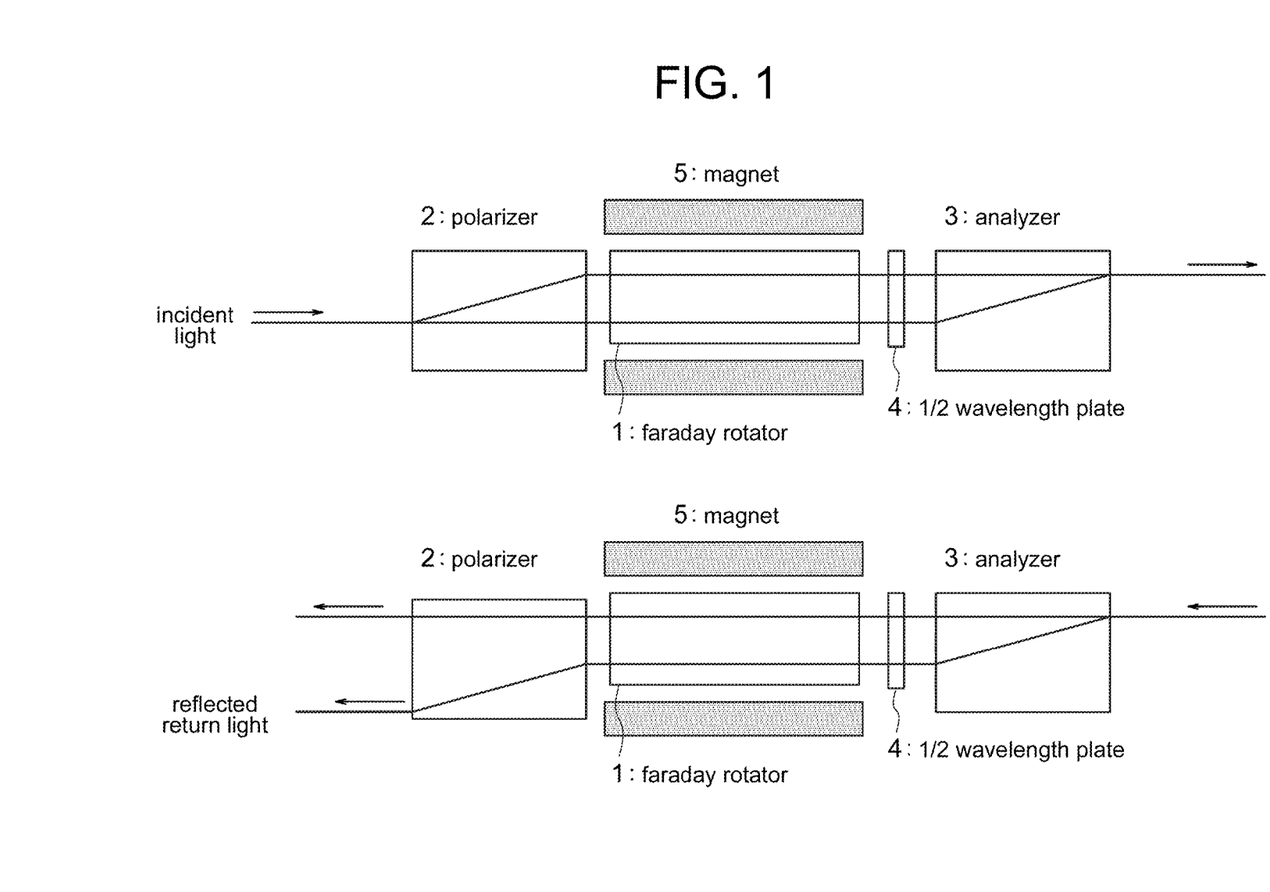

FIG. 1 illustrates an example of the structure of a polarization-independent type optical isolator. In that segment of optical communication field which deals with 500-1200 nm light, fiber laser technology is taking center stage in recent years and optical isolator is used in this fiber laser technology. In particular, for this application a polarization-independent type optical isolator, like the one shown in FIG. 1, is used as it is suited to deal with light that transmits in a fiber; and a Faraday rotator 1 of the present invention in which TGG is used is chiefly in use in such polarization-independent type optical isolators.

The polarization-independent type optical isolator, as shown in FIG. 1, is in general of a structure such that a polarizing material is arranged at either end of the Faraday rotator 1, and the incident light is divided into an ordinary light and an extraordinary light, and the polarized light direction of these is rotated by 45 degrees in the Faraday rotator 1, and, after passing through a ½-wavelength plate 4, they are combined in an analyzer 3 and exit. On the other hand, the light returning in the reverse direction is divided into two lights in the analyzer 3, and, after their passing through the ½-wavelength plate 4, the polarized light direction is rotated by 45 degrees in the Faraday rotator 1, and the divided lights arrive in the polarizer 2; but on this occasion the polarized light direction of the lights differs by 90 degrees from that of the original incident light so that the divided lights are not combined in the polarizer 2 but exit the polarizer 2 in a more widely divided form and hence do not come back to the incident light entrance position wherefore isolator effect is achieved.

EXAMPLES

Next, concrete examples of the present invention will be described.

Example 1

In Example 1, firstly ingredients for TGG were mixed together, and the mixture was pre-baked, and then it was subjected to a hot isostatic pressing (HIP), and was sintered at 1250 degrees C., and a transparent sintered compact having an outer diameter of 6 mm and a length of 22 mm was obtained. Thereafter, both ends of each sample of this transparent sintered compact were ground, and, after etching, the compact's SEM image was examined and also the grain diameter was observed, and it was found that the mean grain diameter of the thus obtained sintered compact was 0.2 micrometer. Incidentally, this mean grain diameter (hereinafter referred to merely "grain diameter") was calculated by counting the number of grains constituting an arbitrary straight line.

Then, in order to observe its influence to the grain diameter, a secondary baking was conducted on this transparent sintered compact for 5 hours at 1400-1700 degrees C.; thereafter the both ends of each sample was ground, and, after etching, the grain diameter was examined and was found to be 0.3-9.8 micrometers. The respective values of the samples are shown in Table 1. From the results of this Table 1, it was confirmed that the higher the secondary baking temperature is, the greater will the grain diameter be.

TABLE 1

Secondary Baking of Samples and Mean Grain Diameters

| Sample | Initial Grain Diameter | Secondary Baking Temperature | Mean Grain Diameter |
|---|---|---|---|
| Sample 1 | 0.2 micrometer | no secondary baking | 0.2 micrometer |
| Sample 2 | | 1400 degrees C. | 0.3 micrometer |
| Sample 3 | | 1460 degrees C. | 0.7 micrometer |
| Sample 4 | | 1480 degrees C. | 1.0 micrometer |
| Sample 5 | | 1580 degrees C. | 3.0 micrometers |
| Sample 6 | | 1630 degrees C. | 5.0 micrometers |
| Sample 7 | | 1690 degrees C. | 9.8 micrometers |

Figure 2:
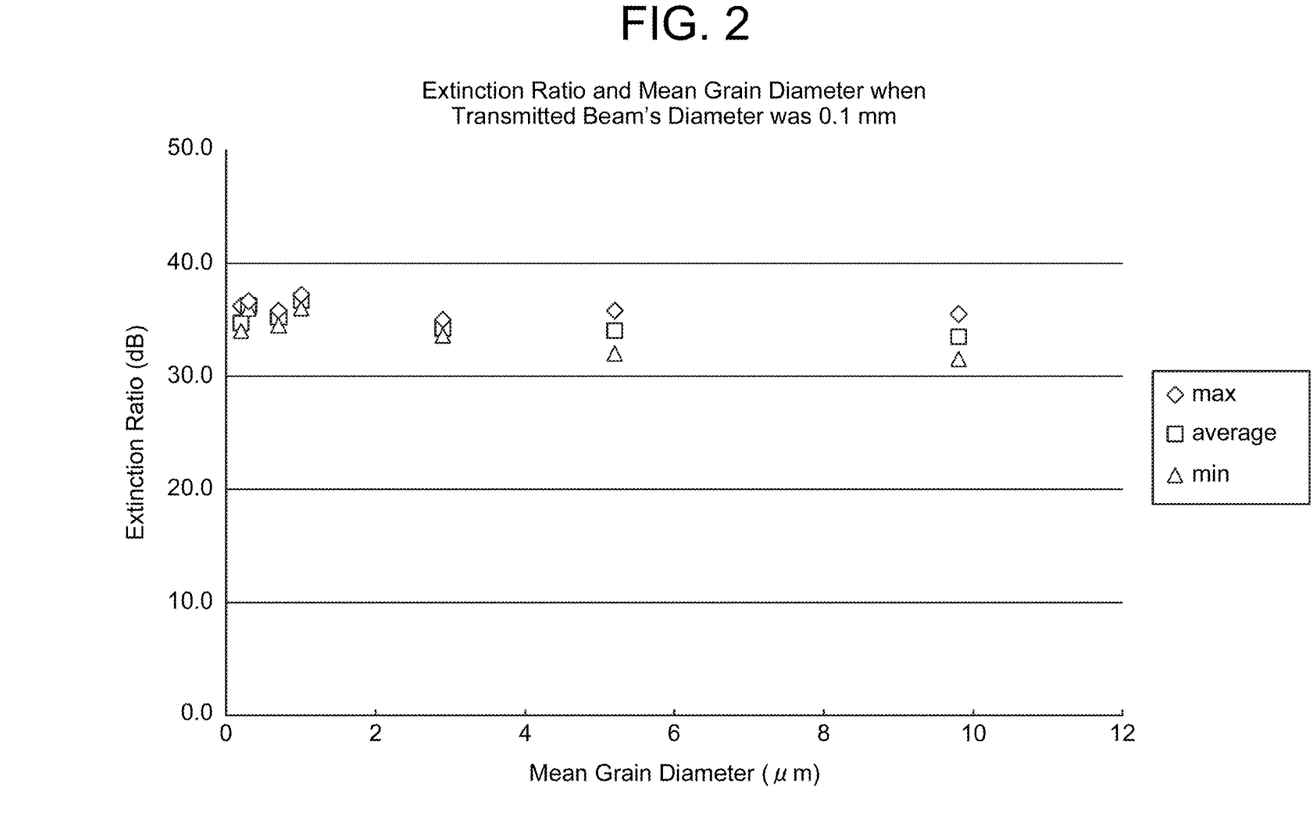

Next, in order to examine the relationship between the laser beam's diameter and grain diameter, work samples having grain diameters as shown in Table 1 were ground and were applied with an anti-reflection coating (AR coating); then a 1064-nm-wavelength laser beam was used to measure extinction ratio at the middle part of the work samples, modifying the laser beam' diameter D to 2.0, 1.0, 0.5, 0.3, 0.2, and 0.1 mm. The measurement results of extinction ratios with respect to respective grain diameters in the case of the laser beam's diameter D being 0.1 mm are shown in Table 2, and the relation between the extinction ratio and the grain diameter is shown in FIG. 2.

From these results, it was confirmed that, when the laser beam's diameter D is 0.1 mm, the fluctuation of the extinction ratio, probably due to an influence of grain boundary, is increased and thus the stability of the values is degraded.

TABLE 2

| Mean Grain Diameter | Extinction Ratio | | |
|---|---|---|---|
| | max | mean | min |
| 0.2 micrometer | 36.2 | 34.7 | 34.0 |
| 0.3 micrometer | 36.6 | 36.2 | 35.8 |
| 0.7 micrometer | 35.8 | 35.2 | 34.5 |
| 1.0 micrometer | 37.2 | 36.7 | 36.0 |
| 3.0 micrometers | 35.0 | 34.2 | 33.6 |
| 5.0 micrometers | 35.8 | 34.0 | 32.0 |
| 9.8 micrometers | 35.5 | 33.5 | 31.5 |

Figure 3:
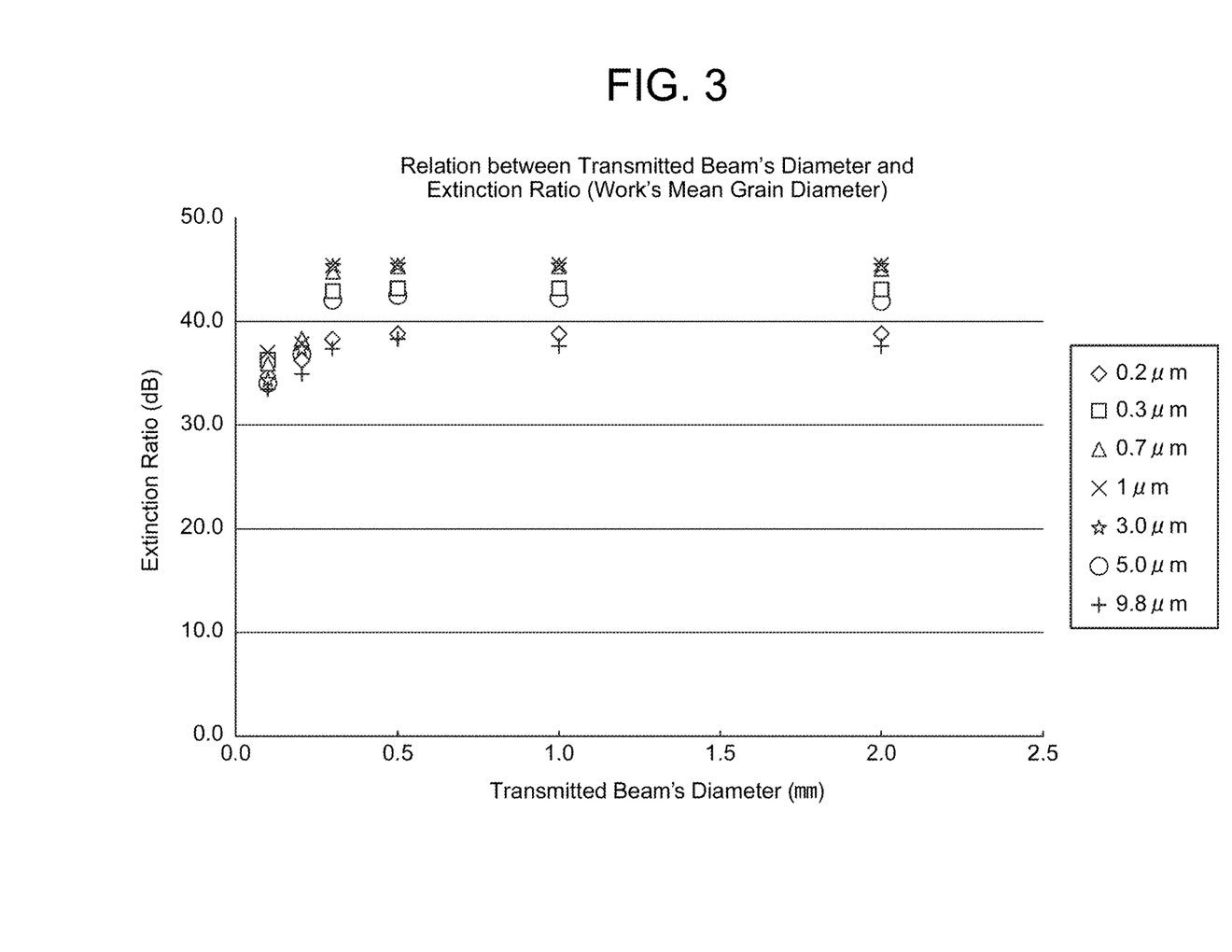

Also, in Table 3 are shown the measured values of extinction ratio taken at the middle part of the work samples of the respective grain diameters, with respect to various laser beam's diameters D of 2.0, 1.0, 0.5, 0.3, 0.2, and 0.1 mm; FIG. 3 shows a relationship between the laser beam's diameter and the extinction ratio.

TABLE 3

| Mean Grain Diameter | Transmitted Beam's Diameter | | | | | |
|---|---|---|---|---|---|---|
| | 0.1 | 0.2 | 0.3 | 0.5 | 1.0 | 2.0 |
| 0.2 micrometer | 34.7 | 36.2 | 38.2 | 38.8 | 38.8 | 38.9 |
| 0.3 micrometer | 36.2 | 37.2 | 42.8 | 43.2 | 43.2 | 43.2 |
| 0.7 micrometer | 35.2 | 38.2 | 44.8 | 45.4 | 45.4 | 45.4 |
| 1.0 micrometer | 36.7 | 37.8 | 45.4 | 45.6 | 45.6 | 45.6 |
| 3.0 micrometers | 34.2 | 37.2 | 45.4 | 45.6 | 45.6 | 45.4 |
| 5.0 micrometers | 34.0 | 36.8 | 42.0 | 42.3 | 42.3 | 42.0 |
| 9.8 micrometers | 33.5 | 34.8 | 37.4 | 38.2 | 37.6 | 37.7 |

From these results, it was confirmed that, with respect to every grain diameters, the extinction ratio is roughly of the same value in the range of the laser beam's diameter D being 2.0-0.5 mm, but that as the beam's diameter is reduced to 0.3, 0.2 and 0.1 mm, the degradation of the extinction capability increases so much that at 0.2 and 0.1 mm it is not possible to obtain an extinction ratio of 38 dB or higher stably. Therefore, in order to obtain an extinction ratio of 38 dB or higher stably, it is necessary that the laser beam's diameter is in the range of 0.3-2.0 mm. Also, with regard to grain diameter, it was confirmed that in order to obtain an extinction ratio of 38 dB or higher stably when the laser beam's diameter is in the range of being 0.3-2.0 mm, the grain diameter is preferably 0.2-5 micrometers, or more preferably 0.3-3.0 micrometers.

It follows from the above results that, in order to make a Faraday rotator having a high extinction ratio or an optical isolator having a high isolation (light shielding capability) using a ceramics sintered compact denoted by $Tb_3Ga_5O_{12}$, it is necessary that the grain diameter of the TGG ceramic sintered compact is 0.2-5 micrometers, and that the transmitted beam's diameter of the Faraday rotator is 0.3 mm or greater.

Next, an in-plane distribution of the extinction ratio in the cases of TGG crystal body and TGG ceramics sintered compact, both after annealing, will be explained.

Figure 4:
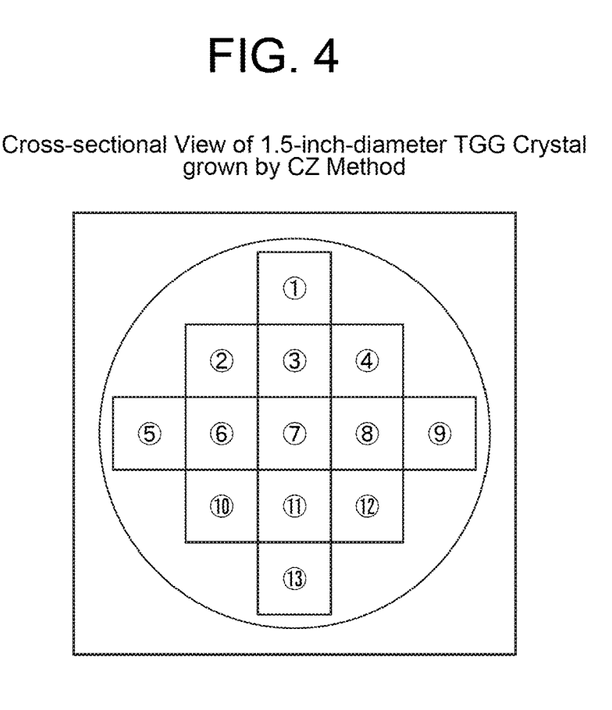

First, with regard to TGG crystal body, a TGG crystal body having a diameter of 1.5 inch was grown by CZ method, and both ends were cut off to make it 20-mm-long, and it was ground, and 13 sites, each consisting of an area of 5-mm square, were appointed as the measurement points. FIG. 4 shows the 13 sites as the measurement points. With respect to the middle part of each one of the 13 sites, a measurement was conducted for the extinction ratio of 1.0-mm-diameter beam (1064 nm), and the extinction ratio was 33-39 dB. Also, these crystal bodies were subjected to an annealing treatment at 1200 degrees C. for 24 hours, and thereafter the measurement was repeated, and the resultant extinction ratio was improved to 36-41 dB. Table 4 shows extinction ratios after the growth and grinding and those after the annealing treatment.

TABLE 4

Extinction Ratio of Grown Crystal

| Measurement Point | After Growth/Grinding | After Annealing |
|---|---|---|
| 1 | 33 | 36 |
| 2 | 34 | 38 |
| 3 | 38 | 40 |
| 4 | 35 | 38 |
| 5 | 31 | 37 |
| 6 | 36 | 41 |
| 7 | 39 | 40 |
| 8 | 35 | 40 |
| 9 | 33 | 37 |
| 10 | 34 | 38 |
| 11 | 36 | 40 |
| 12 | 35 | 39 |
| 13 | 33 | 36 |

It is seen from the results that, in the case of the TGG crystals after grinding, the more peripheral a measurement point is (measurement points 1, 5, 9 and 13), the greater the degradation of extinction ratio becomes; but it was confirmed that the degradation in the extinction ratio in the peripheral sites is amended by the annealing treatment.

Then, the diameter of the light beam was narrowed from 1.0 mm to 0.5 mm and the extinction ratio was measured at the sites of 13 measurement points shown in FIG. 4; similarly as in the case of the previous measurement, it was found that the extinction ratio degrades more as the measurement point moves to peripheral area, and that the extinction ratios in the peripheral sites are improved as the work is subjected to a further annealing treatment for 24 hours at 1250 degrees C.

Figure 5:
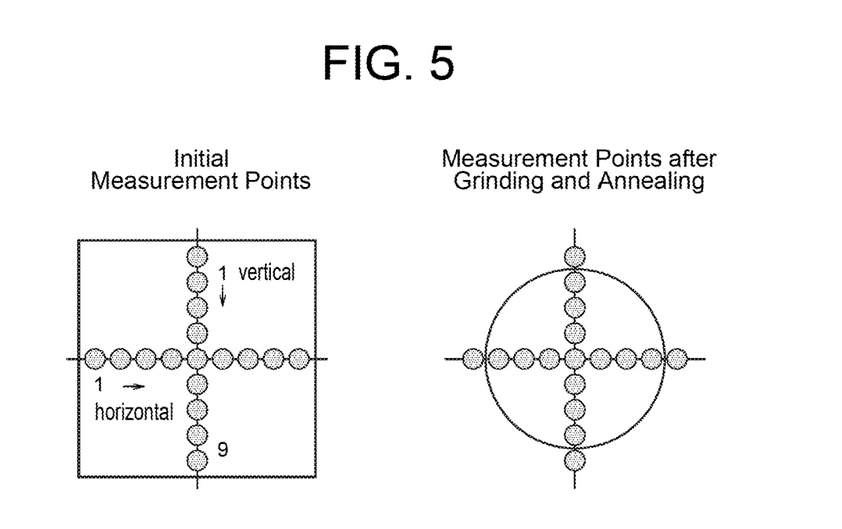

Further, an initial in-plane distribution of extinction ratio of the TGG crystal body on an assumption that the site denoted by the numeral 7 in FIG. 4 is a 5-mm-square as well as an after-grinding in-plane distribution of extinction ratio of the TGG crystal after it was cut to have a 5-mm-square cross section and further ground to eventually have a cross section of a 4.5-mm-outer-diameter circle were both measured using a 0.5-mm-dia beam; and the measurement points were plotted in a manner such that, as shown in FIG. 5, they spread vertically and horizontally from the common central point of the work at an interval of 0.5 mm till there were 9 points vertically as well as 9 points horizontally. Thereafter, the after-ground TGG crystal was subjected to the annealing treatment and was measured for in-plane distribution, and the measurement results shown in Table 5 were obtained.

TABLE 5

In-Plane Distribution of Extinction Ratio of Work Sample (TGG Crystal Boby)

| Measurement Site | | Extinction Ratio (dB) | | |
|---|---|---|---|---|
| | | initial | after grinding | after annealing |
| vertically | 1 | 38.4 | *** | *** |
| | 2 | 37.4 | 36.2 | 42.8 |
| | 3 | 45.4 | 37.4 | 45.6 |
| | 4 | 46.4 | 44.2 | 46.4 |
| | 5 | 46.5 | 46.5 | 46.5 |
| | 6 | 46.4 | 44.6 | 46.5 |
| | 7 | 45.8 | 37.8 | 45.9 |
| | 8 | 37.2 | 35.4 | 42.6 |
| | 9 | 36.1 | *** | *** |
| horizontally | 1 | 34.5 | *** | *** |
| | 2 | 36.8 | 36.4 | 42.6 |
| | 3 | 45.1 | 42.2 | 45.3 |
| | 4 | 46.4 | 43.2 | 46.4 |
| | 5 | 46.5 | 45.2 | 46.5 |
| | 6 | 46.4 | 42.3 | 46.4 |
| | 7 | 45.4 | 41.8 | 45.4 |
| | 8 | 37.2 | 35.8 | 42.2 |
| | 9 | 35.4 | *** | *** |

According to the results of these measurements, it was found again that, in the case of a TGG crystal body before and after grinding, the extinction ratio degrades more as the measurement point moves toward the peripheral area of the work, but it was also confirmed that this degradation of extinction ratio in the peripheral area is significantly amended by means of annealing treatment.

Figure 6:
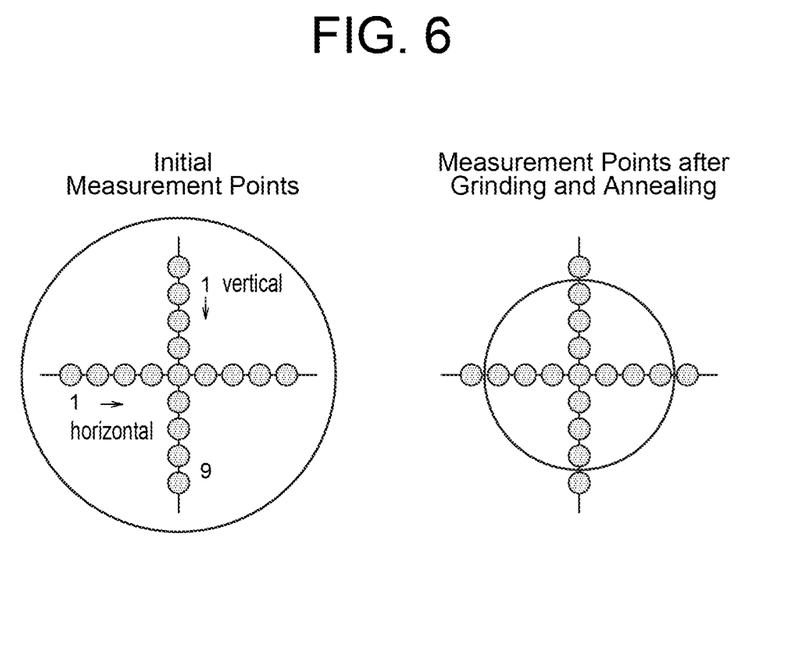

Next, similar measurements as above were conducted on TGG ceramics sintered compact, using the work sample having a mean grain diameter of 0.3 micrometer listed in Table 3. In particular, this ceramics sintered compact was ground, and as shown in FIG. 6, measurement points were plotted at an interval of 0.5 mm in both vertical and horizontal directions totaling 9 points in each direction, and using a 0.5-mm-diameter beam, the initial in-plane distribution of extinction ratio was measured. Thereafter, the compact was ground to an outer diameter of 4.5 mm and an after-grinding in-plane distribution of extinction ratio was measured; then after annealing the same compact (at 1400 degrees C. for 3 hours), its in-plane distribution was measured, and the results of the measurements obtained were as shown in Table 6.

TABLE 6

In-Plane Distribution of Extinction Ratio of Work Sample (Ceramics Sintered Compact)

| Measurement Site | | Extinction Ratio (dB) | | |
|---|---|---|---|---|
| | | Initial | after grinding | after annealing |
| vertically | 1 | 37.6 | *** | *** |
| | 2 | 38.4 | 34.2 | 41.9 |
| | 3 | 44.4 | 36.3 | 42.4 |
| | 4 | 43.4 | 38.8 | 43.7 |
| | 5 | 43.5 | 41.2 | 43.8 |
| | 6 | 43.4 | 40.8 | 43.6 |
| | 7 | 42.3 | 35.8 | 43.2 |
| | 8 | 36.2 | 33.4 | 41.5 |
| | 9 | 36.3 | *** | *** |
| horizontally | 1 | 36.5 | *** | *** |
| | 2 | 36.1 | 34.4 | 40.9 |
| | 3 | 42.1 | 40.2 | 42.9 |
| | 4 | 43.4 | 42.2 | 43.5 |
| | 5 | 43.5 | 41.2 | 43.8 |
| | 6 | 43.4 | 41.6 | 43.6 |
| | 7 | 37.8 | 39.8 | 42.7 |
| | 8 | 36.4 | 34.8 | 42 |
| | 9 | 35.4 | *** | *** |

According to the results of the measurements, it was found, similarly as in the case of TGG crystal body, that the degradation of extinction ratio in the peripheral area is significantly amended by means of annealing treatment.

Comparative Example

Using the work sample of TGG ceramics sintered compact of Example 1, shown in FIG. 5, wherein degradation of extinction ratio was observed in the peripheral area after the compact was ground, an optical isolator as shown in FIG. 1 was constructed, and the optical properties of the thus obtained optical isolator were such that the insertion loss was 0.20 dB, and the optical isolation, being affected by the influence of the degradation of extinction ratio in the peripheral area, was so low as 34.1 dB, not amounting to 35 dB.

Example 2

Then, from this optical isolator used in the above-described Comparative Example the TGG ceramics sintered compact was extracted, and the coating film was removed off its AR coated face by peeling, and the compact was subjected to an annealing treatment for two hours at the same temperature as the secondary baking (1400-1700 degrees C.); thereafter the work sample was ground again and applied with an AR coating and it was measured for extinction ratio, and it was found that the extinction ratio in the peripheral area was improved due to the effect of the annealing treatment. Further, using this work sample an optical isolator was constructed again, and it optical properties were measured with the results that the insertion loss was 0.19 dB and the isolation was as high as 40.2 dB.

EXPLANATION OF REFERENCE NUMERALS

1: Faraday rotator
2: polarizer
3: analyzer
4: ½-wavelength plate
5: magnet

The invention claimed is:

1. A method of making a Faraday rotator, the method comprising:
    providing a ceramics sintered compact represented by $Tb_3Ga_5O_{12}$ having a mean grain diameter of 0.2-5.0 micrometers;
    polishing or grinding the ceramics sintered compact; and
    annealing the ceramics sintered compact at a temperature in a range of 1400-1700° C. after the polishing or grinding of the ceramics sintered compact
    wherein the Faraday rotator has an extinction ratio of 38 dB or higher with respect to a transmitted light beam of a wavelength of 1064 nm and a beam diameter of 0.3 mm or greater.

2. The method of making a Faraday rotator according to claim 1, wherein the mean grain diameter is in a range of 0.3-3.0 micrometers.

3. A method of making an optical isolator comprising the method of making a Faraday rotator according to claim 1.

* * * * *